United States Patent [19]

Wentworth

[11] Patent Number: 5,790,728
[45] Date of Patent: Aug. 4, 1998

[54] OPTICAL COUPLING COMPONENT AND METHOD OF MAKING THE SAME

[75] Inventor: Robert M. Wentworth, Phoenix, Ariz.

[73] Assignee: Motorola, Inc., Schaumburg, Ill.

[21] Appl. No.: 671,866

[22] Filed: Jun. 28, 1996

[51] Int. Cl.[6] .................................................. G02B 6/34
[52] U.S. Cl. ........................ 385/39; 359/15; 385/14; 385/15; 385/37
[58] Field of Search .................................. 385/14, 15, 31, 385/37, 39, 47, 48, 49, 88, 89; 359/15, 19

[56] References Cited

U.S. PATENT DOCUMENTS

| | | | |
|---|---|---|---|
| 4,711,997 | 12/1987 | Miller | 250/216 |
| 5,061,027 | 10/1991 | Richard | 385/14 |
| 5,101,460 | 3/1992 | Richard | 385/37 |
| 5,237,434 | 8/1993 | Feldman et al. | 359/19 |
| 5,335,300 | 8/1994 | Hartman et al. | 385/37 |
| 5,394,490 | 2/1995 | Kato et al. | 385/14 |
| 5,472,907 | 12/1995 | Binsma et al. | 437/129 |
| 5,500,912 | 3/1996 | Alonas et al. | 385/37 |
| 5,513,021 | 4/1996 | Kaneshiro et al. | 359/15 |
| 5,568,574 | 10/1996 | Tanguay, Jr. et al. | 385/14 |
| 5,638,469 | 6/1997 | Feldman et al. | 385/14 |

*Primary Examiner*—John D. Lee
*Attorney, Agent, or Firm*—Kenneth M. Seddon; Daniel R. Collopy

[57] ABSTRACT

An optical component (40) is formed by bonding a light generating device (43) onto a transparent substrate (41). The light generating device can be attached to the transparent substrate (41) using a flip-chip bond. A light detecting device (51) is also bonded to the transparent substrate (41) and positioned so that a portion of the optical signal provided by the light generating device (43) is reflected to the light detecting device (51) through the transparent substrate (41). A holographic film (42) may be formed on the transparent substrate (41) to diffuse the optical signal provided by the light generating device (43).

20 Claims, 1 Drawing Sheet

OPTICAL COUPLING COMPONENT AND METHOD OF MAKING THE SAME

BACKGROUND OF THE INVENTION

This invention relates, in general, to electronic components, and more particularly to optical components for transmitting and receiving an optical data signal.

A conventional optical transmitter or an optoelectronic component 10 is shown in FIG. 1. Optoelectronic component 10 can be used to transmit a data value using optical pulses or to couple various portions of a circuit together. Such a component is used when a system requires that the various portions of the system be electrically isolated from each other. Optoelectronic component 10 uses a light emitting diode 16 (LED), which is mounted on a substrate 14, to provide an optical signal indicated by an arrow 19. A portion of the optical signal is reflected by a glass window 18 downward to a light detecting device 17 that is used to monitor the intensity of the optical signal generated by light emitting diode 16. The portion of the optical signal that is reflected back to light detecting device 17 is indicated in FIG. 1 by an arrow 21.

Glass window 18 is held above light emitting diode 16 by a case 12 that is mounted onto a base 11. Electrical connection to light emitting diode 16 and light detecting device 17 is provided by a set of leads 13 extending from base 11. One problem associated with optoelectronic component 10 is the difficulty in manufacturing such devices due to the relatively tight tolerances in the physical positioning of each component. For example, the efficiency or sensitivity of optoelectronic component 10 can be significantly affected by slight variations in the distance 22 between light emitting diode 16 and glass window 18. In addition, any variation in the planarity of base 11, substrate 14, light emitting diode 16, and glass window 18, or any variation in the positioning of light detecting device 17 can result in a reduction of the amount of light that is reflected back to light detecting device 17.

The effect of these variations is shown in FIG. 1 as an angle 23. Changes in the relative position and planarity of light emitting diode 16 and light detecting device 17 will affect the amount of light (arrow 21) that is reflected back to light detecting device 17. These changes will affect the sensitivity of optoelectronic component 10. By now it should be appreciated that it would be advantageous to provide an optical component that is not subject to such manufacturing tolerances. It would also be advantageous if the optical component required fewer components than the previously known optoelectronic component of FIG. 1.

DETAILED DESCRIPTION OF THE DRAWINGS

In general, the present invention provides an optoelectronic or optical component that is formed by bonding a light generating device and a light detecting device directly onto a transparent substrate. By bonding the light generating device to the transparent substrate and using the transparent substrate to transport reflected light to the light detecting device, many of the manufacturing problems associated with previously known optical components are addressed. In addition, a holographic film is optionally formed on the transparent substrate so that the light generating device can be used to communicate with a plurality of substrates each having their own light detecting device.

Figure 1:
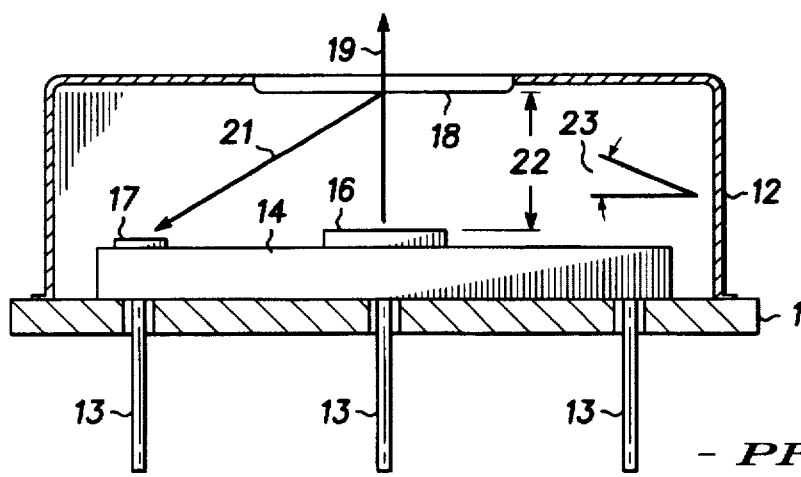
FIG. 1 is an enlarged cross-sectional view of a previously known optoelectronic component.
Figure 2:
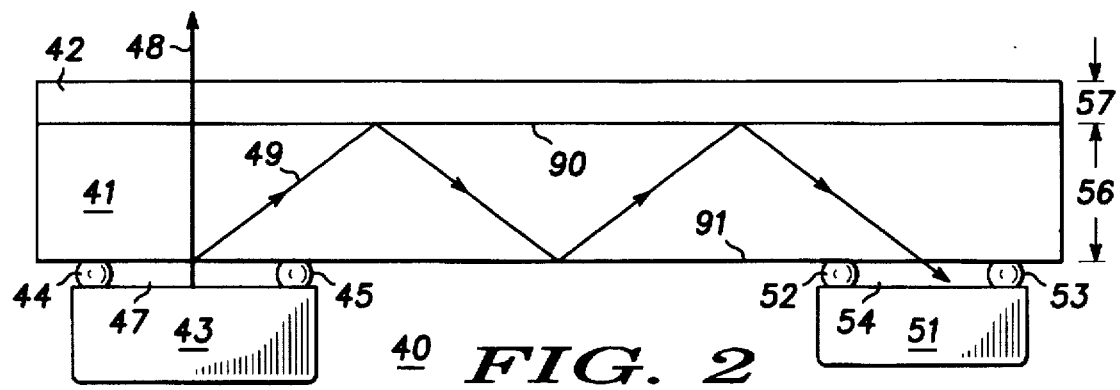
FIG. 2 is a cross-sectional view of an optoelectronic component in accordance with the present invention.

Turning now to FIG. 2, a more detailed description of the present invention is provided. FIG. 2 is a crosssectional view of an optical component 40 that has a light generating device 43 bonded directly to a transparent substrate 41. Preferably, light generating device 43 is a vertical cavity surface emitting laser (VCSEL), but it could also be a light emitting diode (LED), a laser diode, or the like. Transparent substrate 41 has a top surface 90, a bottom surface 91, and can be made from a glass or transparent plastic material that is transparent to the wavelength of the light generated by light generating device 43 as will be explained shortly.

Light generating device 43 is bonded to transparent substrate 41 using a flip-chip bonding technique so that electrical contacts 44 and 45 provide electrical connection to light generating device 43. A variety of flip-chip processes can be used to bond light generating device 43 to transparent substrate 41. As a result of these processes, electrical contacts 44 and 45 represent a solder ball, a conductive tape, or similar adhesive and conductive connection between light generating device 43 and transparent substrate 41. As part of the flip-chip process, an underfill material 47 such as glass, transparent plastic, silicones, optical clear epoxies, or ultraviolet curable epoxy may be formed between light generating device 43 and transparent substrate 41 to prevent contaminants from entering this area and to adjust the optical properties of optical component 40. The use of underfill material 47 should be considered optional and can be used to adjust the index of refraction at the interface of light generating device 43 and transparent substrate 41.

A light detecting device 51, such as a photodiode, a photo-transistor, or the like, is also bonded to transparent substrate 41 and has electrical contacts 52 and 53. External circuitry (not shown) is used to couple to electrical contacts 44, 45, 52, and 52 and to control the operation of light generating device 43 and light detecting device 51. An underfill material 54 may be formed between light detecting device 51 and transparent substrate 41, which can be one of the underfill materials used for underfill material 47. The properties of underfill material 54 can be adjusted to control the light sensing efficiency and accuracy of light detecting device 51.

Light generating device 43 provides an optical signal (shown in FIG. 2 as an arrow 48) with a preferred wavelength of about 500 nanometers to 900 nanometers that passes from bottom surface 91 to top surface 90 of transparent substrate 41. A portion of the optical signal from light generating device 43 is reflected through transparent substrate 41 so that it can be monitored by light detecting device 51. The reflected portion of the optical signal is shown in FIG. 2 as an arrow 49. Using the refractive index of transparent substrate 41, and the wavelength of the optical signal, it is possible to place light detecting device 51 in the optimal position on transparent substrate 41 relative to light generating device 43.

Preferably, transparent substrate 41 has a thickness 56 of about 1 millimeter to 30 millimeters and a refractive index of 10 to 20. Both the thickness and index of refraction of transparent substrate 41 can be adjusted to modify the properties of transparent substrate 41 as a wave guide. Also shown in FIG. 2 is a holographic film 42 that is formed on the top surface 90 of transparent substrate 41. Holographic film 42 is optionally formed to adjust the optical properties of the optical signal (arrow 48) generated by light generating device 43 and the reflected portion (arrow 49) that is transmitted to light detecting device 51. If formed, holographic film 42 has a thickness 57 of about 0.05 millimeters to 0.2 millimeters and can be made from materials such as dichromated gelatin, silver halides, photopolymers, or the like.

Figure 3:
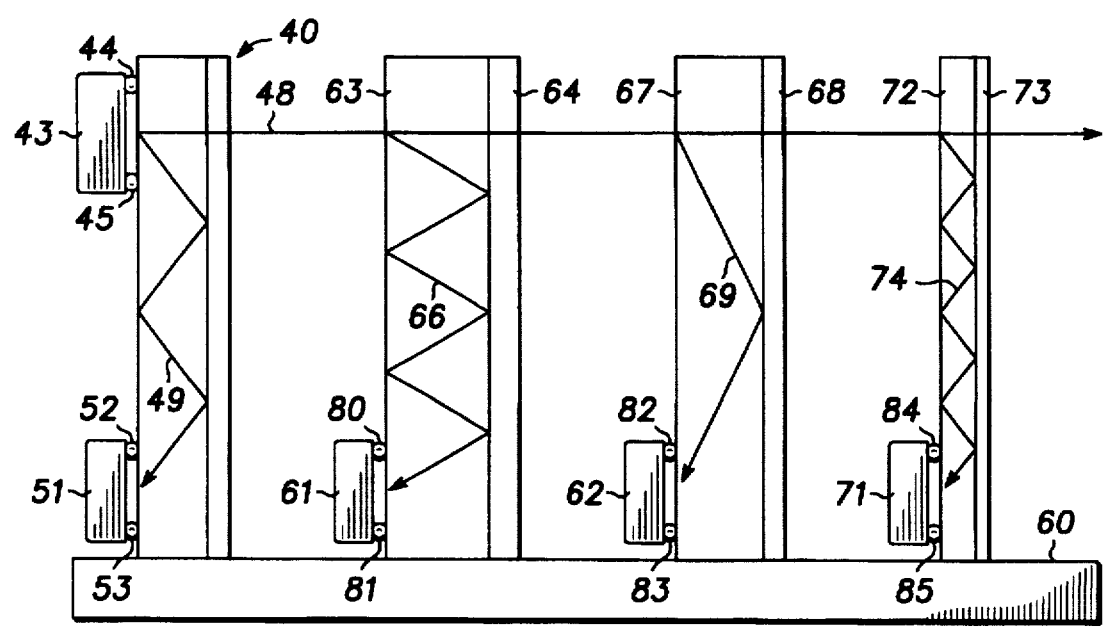
FIG. 3 is a cross-sectional view of the optoelectronic component as it might be used to communicate with other components.

Turning now to FIG. 3, an application for optical component 40 is provided. FIG. 3 is a cross-sectional view of an optical system 59 where optical component 40 transmits data to a plurality of substrates 75, 76, and 77. Substrate 75 comprises a transparent substrate 63 and a light detecting device 61 that is bonded to transparent substrate 63 as shown with electrical contacts 80 and 81. Substrate 76 comprises a transparent substrate 67 and a light detecting device 62 that is bonded to transparent substrate 67 as shown with electrical contacts 82 and 83. Substrate 77 comprises a transparent substrate 72 and a light detecting device 71 that is bonded to transparent substrate 72 as shown with electrical contacts 84 and 85.

Transparent substrates 63, 67, and 72 need only to be transparent to the wavelength of the optical signal (arrow 48) that is generated by optical component 40 and can be the same or different material used to form transparent substrate 41. As shown in FIG. 3, each of transparent substrates 63, 67, and 72 has a different thickness to illustrate how each can act as a wave guide for the optical signal (arrow 48) that passes through it. A portion of the optical signal is reflected through transparent substrate 63, 67, and 72 to light detecting device 61, 62 and 71 as indicated in FIG. 3 by arrow 66, arrow 69, and arrow 74, respectively. Substrates 75, 76, and 77 can optionally include a holographic film 64, 68, and 73, respectively, that is used to diffuse the optical signal (arrow 48) that is passing through each of the substrates 75, 76, and 77.

The optical signal provided by light generating device 43 can be used to couple optical component 40 to each of substrates 75, 76, and 77. Substrates 75 to 77 are arranged so that they are a fixed distance from transparent substrate 41 and are preferably parallel to transparent substrate 41, so that the optical signal (arrow 48) passes through a portion of each of transparent substrates 63, 67 and 72. The optical signal can represent an enable or disable signal or be a coded data stream to allow optical component 40 to communicate with substrates 75 to 77.

One advantage of the present invention is that both the light generating device and the light detecting device are bonded directly to a transparent substrate and the substrate itself is used to transport a portion of the optical signal to monitor the performance of the light generating device. This not only eliminates many of the manufacturing tolerances associated with previously known components, but also reduces the number of components that are required to form the optical component in accordance with the present invention. This will simplify the manufacturing process to form the optical component, and reduce its manufacturing cost as well.

I claim:

1. An optical component comprising:

a first transparent substrate having a top surface and a bottom surface;

a first holographic film overlying the top surface of the first transparent substrate;

a first light detecting device bonded onto the bottom surface of the first transparent substrate; and a light generating device bonded onto the bottom surface of the first transparent substrate, wherein the light generating device generates an optical signal that passes through the first transparent substrate and the first holographic film, and a first portion of the optical signal is reflected off the first holographic film at the top surface of the first transparent substrate, the first portion of the optical signal staying within the first transparent substrate and being directed to the first light detecting device.

2. The optical component of claim 1 wherein the first transparent substrate has an index of refraction of about 0.1 to 2.0.

3. The optical component of claim 2 wherein the first transparent substrate has a thickness of about 1 millimeter to 30 millimeters.

4. The optical component of claim 1 wherein the light generating device is a laser diode.

5. The optical component of claim 1 wherein the optical signal generated by the light generating device has a wavelength of about 500 nanometers to 900 nanometers.

6. The optical component of claim 1 wherein the first light detecting device is a photodiode.

7. The optical component of claim 1 wherein the light generating device and the first light detecting device are bonded to the first transparent substrate with a flip-chip bond.

8. The optical component of claim 1 further comprising:

a second transparent substrate that is physically separated and unconnected from the first transparent substrate and provides a surface, wherein the optical signal from the light generating device passes through a portion of the second transparent substrate;

a second holographic film on the surface of the second transparent substrate; and a second light detecting device bonded onto the second transparent substrate, wherein a second portion of the optical signal generated by the light generating device is reflected through the second transparent substrate to the second light detecting device.

9. An optoelectronic component comprising:

a first substrate having a top surface and a bottom surface;

a light generating device bonded to the bottom surface of the first substrate, wherein the light generating device provides an optical signal, and at least a portion of the optical signal passes through the first substrate, and a portion of the optical signal is reflected off the top surface of the first substrate and back into the first substrate;

a second substrate physically separated from and positioned a first distance from the first substrate so that the optical signal passes through a portion of the second substrate; and a light detecting device bonded to the second substrate, wherein a portion of the optical signal is reflected through the second substrate to the light detecting device.

10. The optoelectronic component of claim 9 further comprising a holographic film on the top surface of the first substrate.

11. The optoelectronic component of claim 9 wherein the first substrate has an index of refraction of about 0.1 to 2.0 and a thickness of about 1 millimeter to 30 millimeters.

12. The optoelectronic component of claim 9 wherein the light generating device is a laser diode.

13. The optoelectronic component of claim 9 wherein the optical signal generated by the light generating device has a wavelength of about 500 nanometers to 900 nanometers.

14. The optoelectronic component of claim 9 wherein the light detecting device is a photodiode.

15. A method of making an optical component comprising the steps of:

provoding a first transparent substrate having a top surface and a bottom surface;

forming a first holographic film overlying the top surface of the first transparent substrate; and bonding a light generating device onto the bottom surface of the first transparent substrate, wherein the light generating device generates an optical signal that passes through the first transparent substrate and the first holographic film, wherein a portion of the optical signal is reflected off the first holographic film and stays within the first transparent substrate.

16. The method of claim 15 further comprising the step of bonding a light detecting device onto the bottom surface of the first transparent substrate so that a portion of the optical signal is reflected through the first transparent substrate to the light detecting device.

17. The method of claim 16 further comprising the steps of:

providing a second transparent substrate having a surface that is positioned a distance from the first transparent substrate so that the optical signal from the light generating device passes through the second transparent substrate; and bonding a second light detecting device onto the second transparent substrate, wherein a portion of the optical signal generated by the light generating device is reflected through the second transparent substrate to the second light detecting device.

18. The method of claim 17 further comprising the step of forming a second holographic film on the surface of the second transparent substrate.

19. The method of claim 15 wherein the first transparent substrate has an index of refraction of about 0.1 to 2.0 and a thickness of about 1 millimeter to 30 millimeters.

20. The method of claim 15 wherein the light generating device is a laser diode and the optical signal generated by the light generating device has a wavelength of about 500 nanometers to 900 nanometers.

* * * * *